(12) United States Patent  
Jeon et al.

(10) Patent No.: US 8,039,141 B2
(45) Date of Patent: Oct. 18, 2011

(54) BATTERY MODULE

(75) Inventors: Yoon-Cheol Jeon, Kyunggi-do (KR); Tae-Yong Kim, Kyunggi-do (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1156 days.

(21) Appl. No.: 11/369,991

(22) Filed: Mar. 8, 2006

(65) Prior Publication Data

US 2006/0204840 A1   Sep. 14, 2006

(30) Foreign Application Priority Data

Mar. 11, 2005 (KR) .................. 10-2005-0020526

(51) Int. Cl.
*H01M 2/02* (2006.01)

(52) U.S. Cl. ..................................................... 429/153

(58) Field of Classification Search .............. 429/152, 429/153, 176, 163

See application file for complete search history.

(56) References Cited

U.S. PATENT DOCUMENTS

| | | | | |
|---|---|---|---|---|
| 2,917,220 A | * | 12/1959 | Bostock | 229/117.17 |
| 6,475,659 B1 | * | 11/2002 | Heimer | 429/66 |
| 2003/0118898 A1 | * | 6/2003 | Kimura et al. | 429/156 |
| 2004/0142238 A1 | | 7/2004 | Asahina et al. | |

FOREIGN PATENT DOCUMENTS

| | | |
|---|---|---|
| EP | 1 143 541 | 10/2001 |
| JP | 61-171058 * | 8/1986 |
| JP | 10-112301 A | 4/1998 |
| JP | 2000-228228 | 8/2000 |
| JP | 2003-007355 | 1/2003 |
| JP | 2003-007355 A | 1/2003 |
| JP | 2003-323871 | 11/2003 |
| JP | 2004-235110 | 8/2004 |
| WO | WO 02/27816 | 4/2002 |

* cited by examiner

*Primary Examiner* — Jennifer Michener
*Assistant Examiner* — Monique Wills
(74) *Attorney, Agent, or Firm* — Lee & Morse, P.C.

(57) ABSTRACT

A battery module including a plurality of unit batteries spaced apart from each other and cell barriers disposed between the unit batteries, wherein the cell barriers have different strengths depending on their position in the battery module.

15 Claims, 5 Drawing Sheets

BATTERY MODULE

BACKGROUND OF THE INVENTION

1. Field of the Invention

The present invention relates to a battery module. More particularly, the present invention relates to a battery module suitable for a secondary battery and including a plurality of unit batteries in which cell barriers disposed in the unit batteries have different characteristics depending on their position in the battery module.

2. Description of the Related Art

As generally understood in the art, a primary battery is a single use battery. In contrast, a secondary battery, commonly known as a rechargeable battery, may be repeatedly discharged and recharged. Secondary batteries are generally classified into different types based on the external shape of the secondary battery. Common secondary battery types include prismatic, e.g., square, and cylindrical batteries. Low power batteries may be used for various portable electronic devices, e.g., cellular phones, laptop computers, camcorders, etc. Larger, bulk size batteries may be used as a power source for drive motor, e.g., as used in hybrid electric vehicles (HEVs).

In order to be used for high power or high capacity applications, e.g., drive motors, HEVs, etc., multiple batteries may be assembled in the form of a battery module. The battery module may be formed by connecting, e.g., serially connecting, several individual batteries. For clarity, individual batteries will be referred to herein as "unit batteries," and assemblies of unit batteries connected in series, parallel, or a combination thereof, will be referred to as "battery modules".

In a battery module each of the respective unit batteries may include an electrode assembly, in which a separator is interposed between a positive electrode and a negative electrode. The electrode assembly may be inserted inside a container, and a cap assembly may be attached to the container to seal the container. The cap assembly may include terminals disposed so as to extend from the inside to the outside of the container, which are electrically connected to the positive and negative electrodes.

Unit batteries may be arranged to alternate positive and negative terminals, such that a positive terminal of a first unit battery may be disposed adjacent to a negative terminal of an adjacent second unit battery. Conductors may be mounted on threaded positive and negative terminals to electrically connect adjacent unit batteries to form the battery module.

A battery module may include several unit batteries to tens of unit batteries. As the unit batteries may generate heat, in a module containing multiple unit batteries there may be a need to efficiently discharge heat generated from each unit battery. In particular, when the battery module is a large, bulk size secondary battery module for, e.g., drive motors, HEVs, electric vehicles, electric scooters, rechargeable vacuum cleaners, etc., the efficient discharge of heat may be of significant importance.

If heat emission from the battery module is not properly managed, the temperature of the battery module may increase excessively, due to heat generated by each unit battery, and the battery module, and the machine connected thereto, may malfunction.

In addition, if the internal pressure of the unit battery is increased due to excessive heat or other factors, e.g., due to a chemical reaction inside the unit battery, the external dimensions of the unit battery may become distorted. This distortion negatively affects the characteristics of the unit battery and may affect the battery module as a whole.

SUMMARY OF THE INVENTION

The present invention is therefore directed to a battery module, which substantially overcomes one or more of the problems due to the limitations and disadvantages of the related art.

It is therefore a feature of an embodiment of the present invention to provide a battery module including cell barriers disposed around and between unit batteries, wherein cell barriers at outermost ends of the battery module are stronger than cell barriers near the center of the battery module.

It is therefore another feature of an embodiment of the present invention to provide a battery module including cell barriers disposed around and between unit batteries, wherein cell barriers near the center of the battery module are configured to deliver enhanced heat transfer as compared to cell barriers at outermost ends of the battery module.

At least one of the above and other features and advantages of the present invention may be realized by providing a battery module including a plurality of unit batteries spaced apart from each other and cell barriers disposed between the unit batteries, wherein the cell barriers have different strengths depending on their position in the battery module.

A cell barrier disposed near an end of the battery module may have more strength than a cell barrier disposed near the center of the battery module. The unit batteries may be stacked and the battery module may further include end plates disposed at the ends of the stack of unit batteries, the end plates configured to support the unit batteries.

The cell barriers may include a first cell barrier in contact with an outermost unit battery of the plurality of unit batteries, and the first cell barrier may have a cooling medium channel passing through the first cell barrier. The cooling medium channel may include a hole that passes through the interior of the first cell barrier along the length direction of the first cell barrier. The first cell barrier may include ribs spaced apart from each other on a surface of a plate, and the cooling medium channel may be defined in part by the ribs and the plate. The first cell barrier may have a corrugated structure, and the cooling medium channel may be defined in part by the corrugations. The unit batteries may be stacked and the battery module may further include end plates disposed at the ends of the stack of unit batteries, the end plates configured to support the unit batteries, and the first cell barrier may be disposed between an end plate and a unit battery.

The cell barriers may include a second cell barrier in contact with two unit batteries, and the second cell barrier may have a plate with a plurality of protrusions on one surface of the plate, the protrusions spaced apart from each other. The second cell barrier may include a pair of the plates, each having the protrusions, the pair of the plates disposed so that the protrusions contact each other. The protrusions may have a conical shape with a cutaway apex.

The cell barriers may include first cell barriers in contact with outermost unit batteries of the plurality of unit batteries, and second cell barriers in contact with two unit batteries. The first cell barriers may be stronger than the second cell barriers. Each of the first cell barriers and the second cell barriers may have a space for a cooling medium to pass through, and the space of each second cell barrier may be greater than the space of each first cell barrier.

At least one of the above and other features and advantages of the present invention may also be realized by providing a battery module including a plurality of unit batteries spaced apart from each other, and cell barriers disposed between the unit batteries, wherein the cell barriers have different shapes depending on their position in the battery module.

At least one of the above and other features and advantages of the present invention may further be realized by providing a battery module including two end plates, two cell barriers of a first type disposed between the end plates, at least two unit cells disposed between the two cell barriers of the first type, and a cell barrier of a second type disposed between the at least two unit cells.

The cell barriers of the first type may have a greater strength than the cell barriers of the second type. The strength may be determined in a width direction of the cell barriers. The cell barriers of the first type may have a different shape than the cell barriers of the second type. The cell barriers may define cooling channels therein, and the cooling channels in the cell barriers of the second type may be larger than the cooling channels in the cell barriers of the first type.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
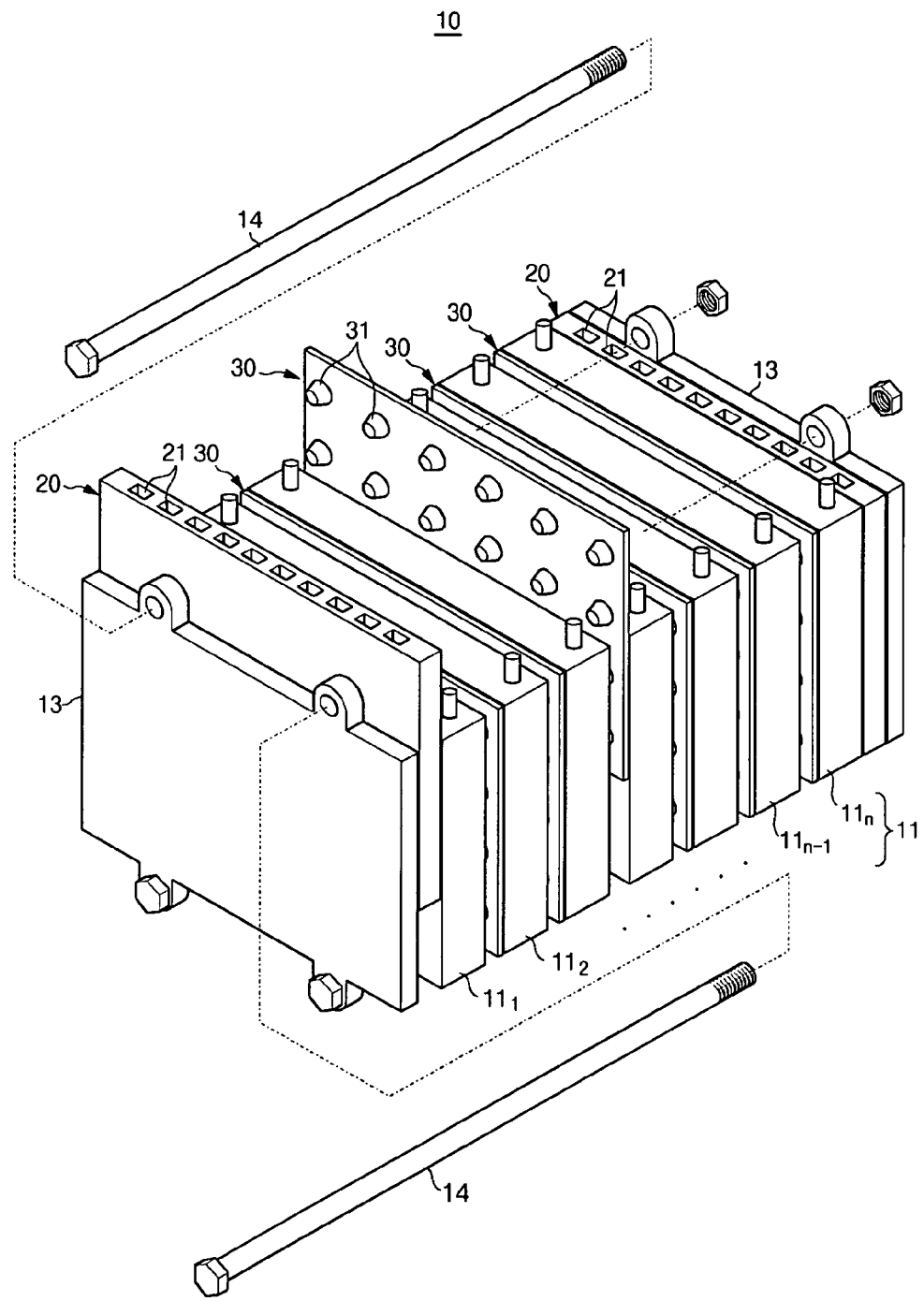
FIG. 1 illustrates a schematic perspective view of a battery module according to an embodiment of the present invention.

Korean Patent Application No. 10-2005-0020526, filed on Mar. 11, 2005, in the Korean Intellectual Property Office, and entitled: "Secondary Battery Module," is incorporated by reference herein in its entirety.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions are exaggerated for clarity of illustration. It will also be understood that when a layer is referred to as being "on" another layer, it can be directly on the other layer, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

A battery module according to the present invention may include one or more cell barriers disposed around and between unit batteries. The cell barrier may provide physical support for the unit batteries. Additionally, the cell barrier may be configured to enable circulation of a cooling medium in a space between adjacent unit batteries. Thus, the cell barrier may support the unit batteries, i.e., by providing a physical restraint against forces that would otherwise tend to distort the unit batteries, and may also reduce or prevent the buildup of excessive heat in the unit batteries, which might otherwise tend to cause expansion or deformation thereof.

Accordingly, in the battery module according to the present invention, the cell barrier may be designed to provide strength as well as providing for efficient heat emission from the battery module. Where multiple cell barriers are included in the battery module, the cell barriers may have different strength and/or heat dissipating characteristics.

In detail, the battery module may be formed as an aggregate of unit batteries, with multiple cell barriers disposed between and around the unit batteries. A cell barrier may be disposed between an end plate and a unit battery, between pairs of adjacent unit batteries, or according to other pattern, as suits the requirements of the particular battery module design. The strength and heat emission characteristics, as well as the positioning, of the cell barriers may be varied within the battery module. That is, if a first portion of the battery module experiences different stresses and heat characteristics than does a second portion of the battery module, the design and placement of cell barriers may be varied between the first and second portions of the battery module.

Thus, according to the present invention, a battery module may include cell barriers having different structures with respect to their position in the battery module. As the cell barriers may be designed to have a different structure depending on the position in the battery module, the battery module according to the present invention may exhibit enhanced structural stability as well as enhanced cooling efficiency, thereby enhancing the overall reliability of the battery module.

In contrast, the conventional cell barrier has a uniform structure, wherein the design of the cell barrier is uniform regardless of the position in the battery module. That is, cell barriers in the conventional battery are not individually configured with respect to local characteristics within the battery module. Thus, the conventional cell barrier structure may exhibit shortcomings in strength and/or heat dissipation, and the conventional battery module may therefore be of unsatisfactory quality.

The battery module according to the present invention may be used for, e.g., high power applications, and may be a secondary or rechargeable battery module, which may be desirable for high draw applications, e.g., motorized equipment such as hybrid electric vehicles, electric vehicles, motor scooters, motorbikes, portable vacuum cleaners, etc.

FIG. 1 illustrates a schematic perspective view of a battery module according to an embodiment of the present invention. Referring to FIG. 1, a battery module 10 according to the present invention may include a plurality of unit batteries 11, i.e., unit batteries $11_1 \ldots 11_n$, spaced apart from each other by a predetermined distance. The unit batteries 11 may be, e.g., a square type secondary battery. Each unit battery 11 may include a container, an electrode assembly including a positive electrode, a negative electrode and a separator disposed in the container, and a cap assembly disposed to cover the container.

The battery module 10 may include one or more cell barriers between and around the unit batteries 11. The battery module 10 may include two types of cell barriers 20, 30. One or more of each type of cell barrier 20, 30, may be included in the battery module 10. The cell barriers 20, 30 may be disposed around and between, and in contact with, adjacent unit batteries 11 to support them. The cell barriers 20, 30 may be configured to flow a cooling medium, e.g., air, between the unit batteries 11.

The unit batteries 11 and the cell barriers 20, 30 may be sandwiched between end plates 13 disposed at opposing ends of the battery module 10. A fastener 14, e.g., a threaded rod or bolt, may align and restrain the end plates 13, thus fixing the assemblage of the unit batteries 11 and the cell barriers 20, 30 in place. The assembly may be mounted in a housing (not shown). The housing may include cooling medium flow paths, e.g., inlets and outlets for receiving and discharging air, in order to cool the unit batteries 11 through heat exchange.

The two types of cell barriers 20, 30 may be positioned differently within the battery module 10 and may be designed to have different strength and/or heat transfer characteristics. The first cell barriers 20 may be disposed at or near both outermost ends of the battery module 10, by the end plates 13. The second cell barriers 30 may be disposed in the center portion of the battery module 10, i.e., at positions other than the outermost ends, and may have a different structure from the first cell barriers 20.

The first cell barriers 20 may have a stronger structure that the second cell barriers 30, such that they are capable of withstanding a greater amount of stress than the second cell barriers 30. In particular, the first cell barriers 20 may be capable of withstanding a greater pressure in the width direction, i.e., withstanding a force applied in parallel to the fastener 14, than are the second cell barriers 30. Accordingly, in the presence of forces that tend to distort the unit batteries 11, i.e., swelling or other distortion, the first cell barriers 20 may be less likely to deform than the second cell barriers 30.

In particular, it has been determined through heat flow analysis that the unit batteries $11_1$ and $11_n$ disposed near the end plates 13 can operate cooler during operation than other unit batteries 11 that are more central to the battery module 10, perhaps because they are disposed nearer to the outside air as compared with the other unit batteries. Accordingly, the first cell barriers 20 may be designed with a structure that enhances strength and may be less effective at heat transfer, as compared to the second cell barriers 30.

In this regard, referring again to FIG. 1, the first cell barriers 20 may be disposed in the battery module 10 such that one side surface is in contact with the adjacent unit battery $11_1$ or $11_n$, respectively, while the other side surface is in contact with the respective end plate 13. Further, a plurality of channels 21 may be formed in each first cell barrier 20, in order to allow the cooling medium to pass through. The channels 21 may be in the form of holes or tubes, including those with a rectangular cross-section, passing through the length of the first cell barrier 20. The channels 21 may have the sidewalls thereof defined only by the cell barrier 20, i.e., they may be passages formed inside the body of the first cell barrier 20.

Figure 2:
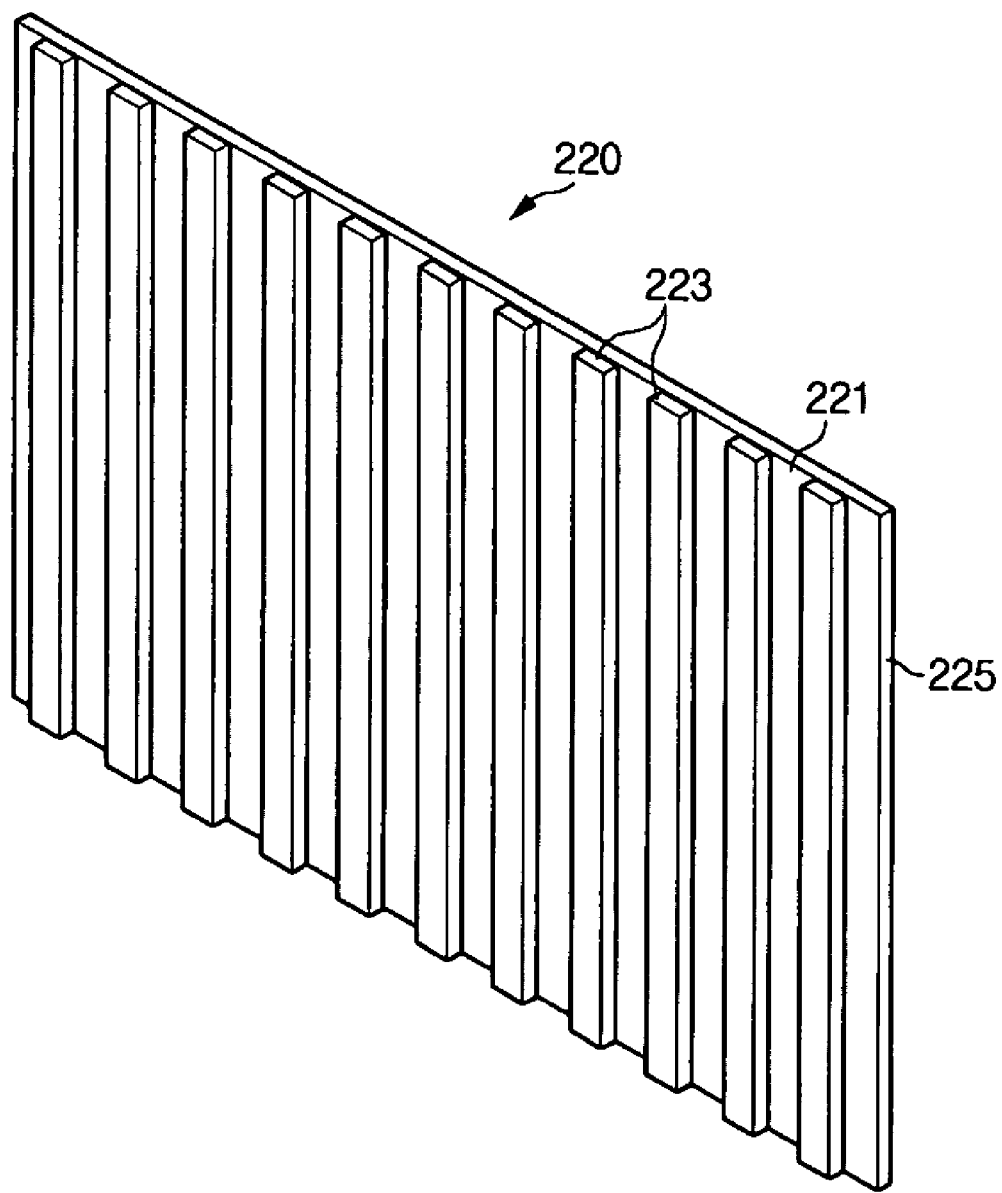
FIGS. 2 and 3 illustrate perspective views of a first cell barrier according to other embodiments of the present invention.
Figure 3:
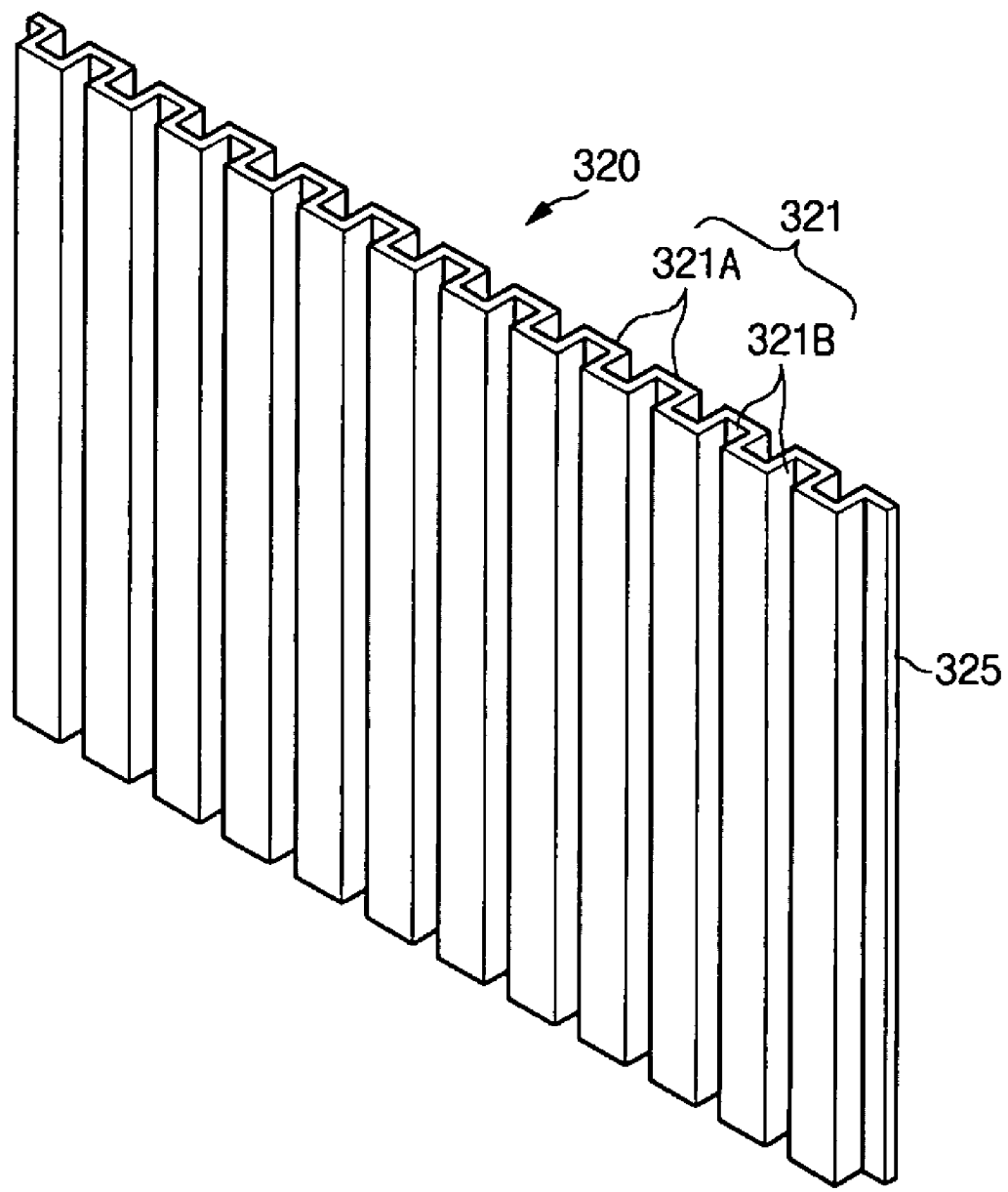

In other embodiments, the channels 21 may have sidewalls thereof defined in part by the adjacent unit battery 11 or end plate 13. FIGS. 2 and 3 illustrate perspective views of a first cell barrier according to other embodiments of the present invention. Referring to FIG. 2, a first cell barrier 220 according to an embodiment of the present invention includes plurality of channels 221 that are defined in part by the adjacent unit battery 11 or end plate 13.

In particular, the first cell barrier 220 may include a plate 225 having a size corresponding to the size of the side surface of the unit battery 11 or end plate 13 that it will be disposed against. A plurality of ribs 223 may be disposed on a surface of the plate 225. The ribs 223 may have a uniform or varying width, and may be spaced apart from each other by a uniform or varying distance, as suits the needs of the particular application. The shapes of the ribs 223 are not limited to any specific shape. The first cell barrier 220 may be positioned in the battery module 10 such that the plate 225 is adjacent to the end plate 13, in which case the channel 221 for the cooling medium is defined by the plate 225, the ribs 223 and the adjacent unit battery $11_1$ (or $11_n$). Alternatively, the first cell barrier 220 may be reversed, such that the plate 225 is adjacent to the unit battery $11_1$ ($11_n$). In this case, the plate 225 and ribs 223 of first cell barrier 220, in cooperation with the end plate 13, define the channel 221 for the cooling medium. The first cell barrier 220 may also have ribs 223 formed on both sides of the plate 225 (not shown).

Referring to FIG. 3, in another embodiment the first cell barrier 320 may have a corrugated or folded structure having ridges and valleys, such that channels 321 are defined by the folds. The channels 321 may be defined on two sides of the first cell barrier 320, allowing the cooling medium to flow between the first cell barrier 320 and adjacent end plate 13, or unit battery 11, as the case may be. The first cell barrier 320 may include a plate 325 defining channels 321A on one side and channels 321B on the other. The corrugations in the plate 325 may extend along a height or width direction of the battery module 10, and may be formed in varying sizes. The corrugations need not be uniform, and thus the widths of the channels 321A and 321B may vary across the first cell barrier 320. The first cell barrier 320 may have a size corresponding to the size of the side surface area of the adjacent unit battery 11.

Figure 4:
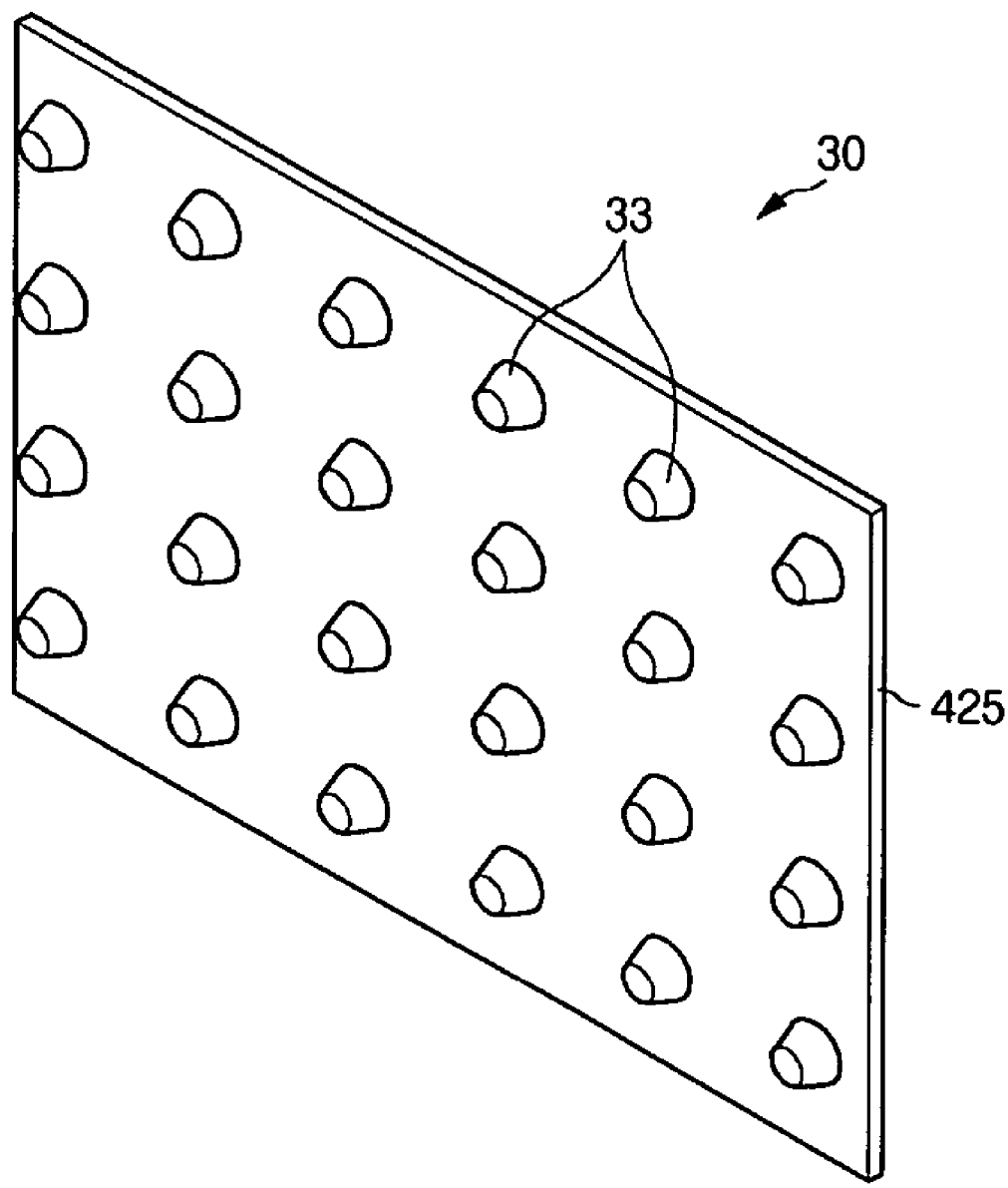
FIG. 4 illustrates a perspective view of a second cell barrier according to an embodiment of the present invention.

FIG. 4 illustrates a perspective view of a second cell barrier according to an embodiment of the present invention. Referring to FIG. 4, the second cell barrier 30 may be structured to enhance heat transfer characteristics rather than strength, as compared with the first cell barriers 20. The second cell barrier 30 may include a plurality of protrusions 33 extending from a surface of a plate 425. The protrusions 33 may be arranged in a regular pattern and spaced apart from each other by a predetermined distance. In the second cell barriers 30, the protrusions 33 may have a conical shape with a cutaway apex, so as to be wide at the bottom, or plate side, and narrow at the top. Their height may be adapted according to the design of the battery module 10. The protrusions 33 may perform a support function and may also define a flow path for the cooling medium flowing across the adjacent unit battery 11.

The protrusions 33 extending from the surface of the plate 425 may be in contact with an adjacent unit battery 11 and the opposite surface of the plate 425 may be in contact with another adjacent unit battery 11, i.e., the second cell barriers 30 may be disposed between and in contact with a pair of unit batteries 11. Cooling medium may flow through the space defined between the unit battery 11 and the surface of the plate 425, among the protrusions 33.

With respect to the first cell barriers 20, the space for cooling medium flowing across the second cell barriers 30 may be larger. Correspondingly, with respect to the second cell barriers 30, the first cell barriers 20 may have a heavier, stronger structure to oppose expansion/deformation of the unit batteries 11.

Figure 5:
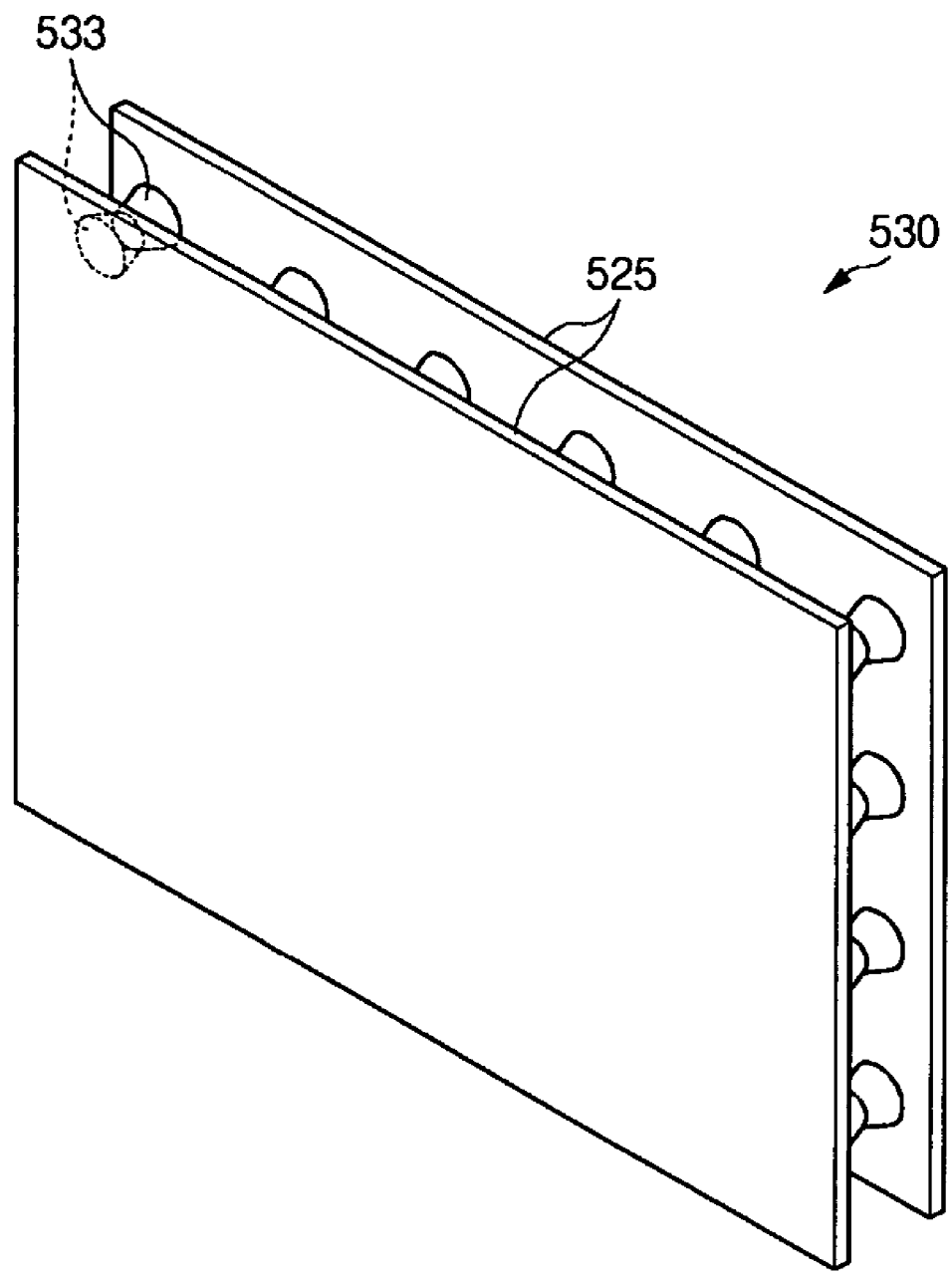
FIG. 5 illustrates a perspective view of a second cell barrier according to another embodiment of the present invention.

FIG. 5 illustrates a perspective view of a second cell barrier according to another embodiment of the present invention. Referring to FIG. 5, in this embodiment the cell barrier 530 may be formed of a pair of the cell barriers 30 illustrated in FIG. 4. In particular, the protrusions 533 may face each other and may be disposed between a pair of plates 525. The facing protrusions 533 may be in contact, and the plates 525 may be bonded together by way of the protrusions 533.

As set forth herein, according to the present invention, the first cell barriers 20 and the second cell barriers 30 may be disposed between the unit batteries 11 in the battery module 10 and may be arranged in predetermined positions in the battery module 10 according to the physical stresses and localized temperatures therein. The first cell barriers 20 may be designed to enhance their strength and may be disposed at outer positions in the battery module 10. As the first cell barriers 20 have more strength/weight than the second cell barriers 30, they can be disposed at the end plates 13 where stresses in the battery module 10 are greatest. Accordingly, when it receives energy from the outside, the first cell barrier 20 has low stress distribution, thereby enhancing the stress characteristics of the battery module 10.

The second cell barriers 30 may be designed to enhance their heat transfer characteristics, such that the cooling medium provided to the battery module 10 may pass through the second cell barriers 30 more efficiently than through the first cell barriers 20 when cooling the unit batteries 11. Accordingly, the unit batteries 11 that are in the more unfavorable positions with respect to heat may be paired with the second cell barriers 30 in order to enhance cooling.

Thus, the battery module 10 can overcome the problems of stress and heat emission characteristic of conventional battery modules through the specific designs and placement of the first and second cell barriers 20, 30.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery module, comprising:
   a plurality of unit batteries spaced apart from each other; and
   cell barriers, the cell barriers including flow pathways for directing the flow of cooling medium therethrough, the cell barriers being disposed adjacent to the unit batteries, and the unit batteries and the cell barriers being alternately stacked in the battery module to form a stacked structure, wherein:
   the cell barriers have different strengths depending on their position in the battery module relative to a center of the battery module,
   a cell barrier disposed near an end of the battery module has a first structure that is stronger and that is less effective at heat transfer by the cooling medium than a second structure of a cell barrier disposed closer to the center of the battery module than the first structure,
   the stacked structure includes at least one cell barrier having the second structure disposed between two adjacent unit batteries, end plates disposed at opposing ends of the stacked structure, the end plates being configured to support the unit batteries, and at least two cell barriers having the first structure and being disposed only adjacent to the end plates in the stacked structure,
   the first structure of the cell barrier disposed near the end of the battery module is different from the second structure of the cell barrier disposed near the center of the battery module such that the flow pathways of the first structure of the cell barrier disposed near the end of the battery module are defined by cooling medium channels and the flow pathways of the second structure of the cell barrier disposed near the center of the battery module are defined by protrusions that are spaced apart,
   the cell barriers include a first cell barrier having the first structure in direct contact with a first side of an outermost unit battery of the unit batteries in the stacked structure, and a second cell barrier having the second structure in direct contact with a second side of the outermost unit battery, the first side opposing the second side, and
   each cooling medium channel of the first cell barrier having the first structure includes a hole that passes through an interior of the first cell barrier along a length direction of the first cell barrier, and the cooling medium channel is absent from the cell barriers having the second structure.

2. The battery module as claimed in claim 1, wherein the first cell barrier includes ribs spaced apart from each other on a surface of a plate, and
   the plurality of cooling medium channels is defined in part by the ribs and the plate.

3. The battery module as claimed in claim 1, wherein the first cell barrier has a corrugated structure, and the cooling medium channels are defined in part by the corrugations.

4. The battery module as claimed in claim 1, wherein the unit batteries and cell barriers are alternately stacked and the battery module further includes:
   the end plates disposed at the ends of the stack of unit batteries, and
   the first cell barrier having the first structure is disposed between one end plate of the end plates and a unit battery.

5. The battery module as claimed in claim 4, wherein the cell barriers include the second cell barrier having the second structure in contact with two adjacent unit batteries, and
   the second cell barrier has a plate with the protrusions on one surface of the plate.

6. The battery module as claimed in claim 5, wherein the second cell barrier includes a pair of the plates in direct contact with each other, each plate having the protrusions, the pair of the plates being disposed so that the protrusions overlap each other.

7. The battery module as claimed in claim 5, wherein the protrusions have a conical shape with a cutaway apex.

8. The battery module as claimed in claim 1, wherein the first cell barriers are configured to withstand a greater amount of force than the second cell barriers.

9. The battery module as claimed in claim 8, wherein the flow pathways of the first cell barriers includes a lesser amount of space for the cooling medium to pass therethrough than the flow pathways of the second cell barriers.

10. A battery module, comprising:
    a plurality of unit batteries spaced apart from each other; and
    cell barriers, the cell barriers including flow pathways for directing the flow of cooling medium therethrough, the cell barriers being disposed adjacent to the unit batteries, and the unit batteries and the cell barriers being alternately stacked in the battery module to form a stacked structure, wherein:
    the cell barriers have different structures depending on their position in the battery module relative to a center of the battery module,
    a cell barrier disposed near an end of the battery module has a first structure that is stronger and that is less effective at heat transfer by the cooling medium than a second structure of a cell barrier disposed closer to the center of the battery module than the first structure,
    the stacked structure includes at least one cell barrier having the second structure disposed between two adjacent unit batteries, end plates disposed at opposing ends of the stacked structure, the end plates being configured to support the unit batteries, and at least two cell barriers having the first structure and being disposed only adjacent to the end plates in the stacked structure, the first structure of the cell barrier disposed near the end of the battery module is different from the second structure of the cell barrier disposed near the center of the battery module, such that the flow pathways of the first structure of the cell barrier disposed near the end of the battery module are defined by cooling medium channels and the flow pathways of the second structure of the cell barrier disposed near the center of the battery module are defined by protrusions that are spaced apart, the cell barriers include a first cell barrier having the first structure in direct contact with a first side of an outermost unit battery of the unit batteries in the stacked structure, and a second cell barrier having the second structure in direct contact with a second side of the outermost unit battery, the first side opposing the second side, and each cooling medium channel of the first cell barrier having the first structure includes a hole that passes through an interior of the first cell barrier along a length direction of the first cell barrier, and the cooling medium channel is absent from the cell barriers having the second structure.

11. A battery module, comprising:

two end plates;

cell barriers, the cell barriers including flow pathways for directing the flow of cooling medium therethrough, the cell barriers being disposed in the battery module, the cell barriers including two cell barriers of a first type structure disposed between the end plates and near respective ends of the battery module and a cell barrier of a second type structure disposed closer to a center of the battery module than the two cell barriers of the first type structure; and at least two unit cells disposed between the two cell barriers of the first type structure, the at least two unit cells and the cell barriers being alternately stacked in the battery module to form a stacked structure, wherein:

the two cell barriers of the first type structure are stronger and less effective at heat transfer by the cooling medium than the cell barrier of the second type structure, and the cell barrier of the second type structure is disposed between the at least two unit cells, the two end plates are disposed at opposing ends of the stacked structure, the two end plates being configured to support the unit cells, and at least two cell barriers having the first type structure and being disposed only adjacent to the end plates in the stacked structure, the two cell barriers of the first type structure are disposed near the end of the battery module is different from the cell barrier of the second type structure disposed closer to the center of the battery module, such that the flow pathways of the two cell barriers of the first type structure are defined by cooling medium channels and the flow pathways of the cell barrier of the second type structure are defined by protrusions that are spaced apart, the two cell barriers of the first type structure include a first cell barrier having the first type structure in direct contact with a first side of an outermost unit cell of the at least two unit cells in the stacked structure, and the cell barrier having the second type structure is in direct contact with a second side of the outermost unit battery, the first side opposing the second side, and each cooling medium channel of the first cell barrier having the first type structure includes a hole that passes through an interior of the first cell barrier along a length direction of the first cell barrier, and the cooling medium channel is absent from the cell barrier having the second type structure.

12. The battery module as claimed in claim 11, wherein the strength is determined in a width direction of the cell barriers.

13. The battery module as claimed in claim 11, wherein the two cell barriers of the first type structure have a same size as and a different shape from the cell barrier of the second type structure.

14. The battery module as claimed in claim 13, wherein the flow pathways in the cell barrier of the second type structure are larger than the flow pathways in the cell barriers of the first type structure.

15. The battery module as claimed in claim 1, wherein the cooling medium is cooling air, and the cell barriers having the first and second structures are each spaced apart from each other between the unit batteries such that their respective flow pathways for the cooling air are, in turn, spaced apart from each other by the unit batteries.

* * * * *